United States Patent [19]

Fujimoto

[11] Patent Number: 4,766,546

[45] Date of Patent: Aug. 23, 1988

[54] NUMERICALLY CONTROLLED APPARATUS INCLUDING FUNCTIONS OF SYNCHRONOUS-SIMULTANEOUS TRANSACTION AND INDEPENDENT-SIMULTANEOUS TRANSLATION

[75] Inventor: Akihiko Fujimoto, Nagoya, Japan

[73] Assignee: Mitsubishi Denki Kabushiki Kaisha, Tokyo, Japan

[21] Appl. No.: 21,861

[22] Filed: Mar. 4, 1987

[30] Foreign Application Priority Data

Aug. 29, 1985 [JP] Japan ................................ 60-190411

[51] Int. Cl.[4] ..................... G05B 19/407; G06F 15/46
[52] U.S. Cl. .................................. 364/474; 318/573; 318/574; 364/169
[58] Field of Search ............................... 364/167–171, 364/474, 475; 318/573–575

[56] References Cited

U.S. PATENT DOCUMENTS

| | | | |
|---|---|---|---|
| 4,424,569 | 1/1984 | Imazeki et al. | 364/169 X |
| 4,534,001 | 8/1985 | Nozawa et al. | 364/474 |
| 4,543,625 | 9/1985 | Nozawa et al. | 318/573 X |
| 4,648,024 | 3/1987 | Kato et al. | 364/474 X |
| 4,665,493 | 5/1987 | Hattori | 318/573 X |
| 4,692,873 | 9/1987 | Kishi et al. | 364/474 |

*Primary Examiner*—Joseph Ruggiero
*Attorney, Agent, or Firm*—Armstrong, Nikaido, Marmelstein & Kubovcik

[57] ABSTRACT

A numerical control apparatus is disclosed by which tools are controlled concurrently with respect to their translations in the X-axis, the Y-axis, and the Z-axis in synchronism with or independently of each other. The numerical control apparatus comprises a memory region for storing the translation axis data; a memory region for storing the distance data; a memory region for storing synchronous-translation velocity data; a memory region for storing independent-translation velocity data; and a memory region for storing independent-translation axis data.

3 Claims, 5 Drawing Sheets

NUMERICALLY CONTROLLED APPARATUS INCLUDING FUNCTIONS OF SYNCHRONOUS-SIMULTANEOUS TRANSACTION AND INDEPENDENT-SIMULTANEOUS TRANSLATION

BACKGROUND OF THE INVENTION

The present invention generally relates to a numerical control apparatus, and more particularly to a machine tool which is controlled to move along a plurality to separate translation axes.

Numerical control apparatus have been widely utilized awith a process control system so as to realize automatic operations and improve machining precision of machine tools.

In such machine tools, a workpiece is fixed on a working table, and this working table is moved or translated along an X-axis and a Y-axis based on data initially input in such a manner that the workpiece is positioned opposite to a tool such as a cutting tool and a drill in these machine tools. After such an initial translation, these tools are translated a predetermined distance toward the workpiece along an X-axis, a Y-axis and a Z-axis perpendicular to the X and Y-axes so as to process the workpiece. These tools are positioned, for example, one on the X-axis for machining the plane of the workpiece normal to the X-axis and the other on the Y-axis machining the plane of the workpiece normal to the Y-axis, and are translated either in incremental translation steps or moved in one step to absolute coordinates. Often it is required to control these tools so that their translation can be performed either in synchronism with or independently of each other. Also, it may be required to translate a tool in a vectorial direction in which the translation consists of multi-axial components and therefore translations along all axes must be in synchronism.

The process data to control the translation of the working table in both the X-axis and Y-axis and to control the translation of the tools in the X-axis, the Y-axis, and the Z-axis is initially stored into numerical control apparatus as numerical data.

In one prior art example of numerical control apparatus for a machine tool, numerical data is broken down into axis data, velocity data, and distance data and these data are stored in separate regions of a memory unit as shown in FIG. 3.

In a memory unit 4, axis data for designating the axis in which a translation is to be performed, velocity data for designating a velocity at which the translation is to be performed in the axis, and the distance across which the translation is to be performed in the axis are each stored in memory regions 41, 42 and 43 respectively.

The translation, in this prior art example, in each axis is successively effected, and tools can be translated in a single axis at a time but not in a vectorial direction defined by plural axes.

In another prior art example, the numerical control apparatus can perform a vectorial translation. Naturally, the translation components in plural axes are performed at the same time, namely in synchronism with each other. But, in this prior art apparatus, it is not possible to simultaneously operate plural tools, each moving in an axis different from axes in which the other tools move.

SUMMARY OF THE INVENTION

It is therefore an object of the present invention to provide a numerical control apparatus by which plural tools are controlled concurrently, their translations in the X-axis, the Y-axis, and the Z-axis being in synchronism with or being independent of each other. The present invention can be applied for not only control of the above-mentioned machine tools but also for numerical control of robots controlled with respect to plural translation axes or for equipments having many arms and actuators.

BRIEF DESCRIPTION OF THE DRAWINGS

The above purpose and other useful and novel features of the invention will become more readily apparent in the following description of the accompanying drawings, in which.

DETAILED DESCRIPTION OF THE PREFERRED EMBODIMENT

Figure 1:
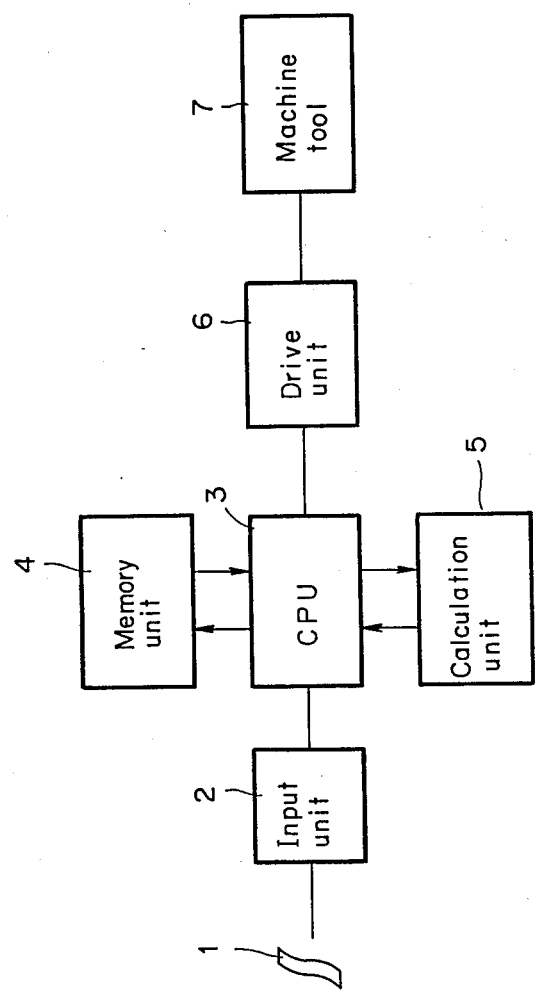
FIG. 1 is a block diagram of a numerical control apparatus according to a preferred embodiment.

FIG. 1 shows a numerical control apparatus for a machine tool. Numerical control data stored in a paper tape 1 or the like is read out by an input unit 2 such as a tape reader, and processed in a central processing unit 3 (referred to as CPU hereafter) as required, and thereafter stored in a memory unit 4. In response to execution commands, the numerical control of CPU 3, and the required calculation is performed in a calculation unit 5 to control a machine tool 7 via a drive unit 6.

The apparatus controls the following three kinds of translations. They are (1) a linear translation in which a single translation in an axis is performed at a time, (2) an independent translation in which translations of plural tools are performed in different axes at a time independently, without being operated in synchronism with each other, and (3) a synchronous translation in which translations of a plurality of tools in different axes or translation of a single tool in a vectorial direction are performed at a time, each axial component of translation starting and ending simultaneously.

Figure 2:
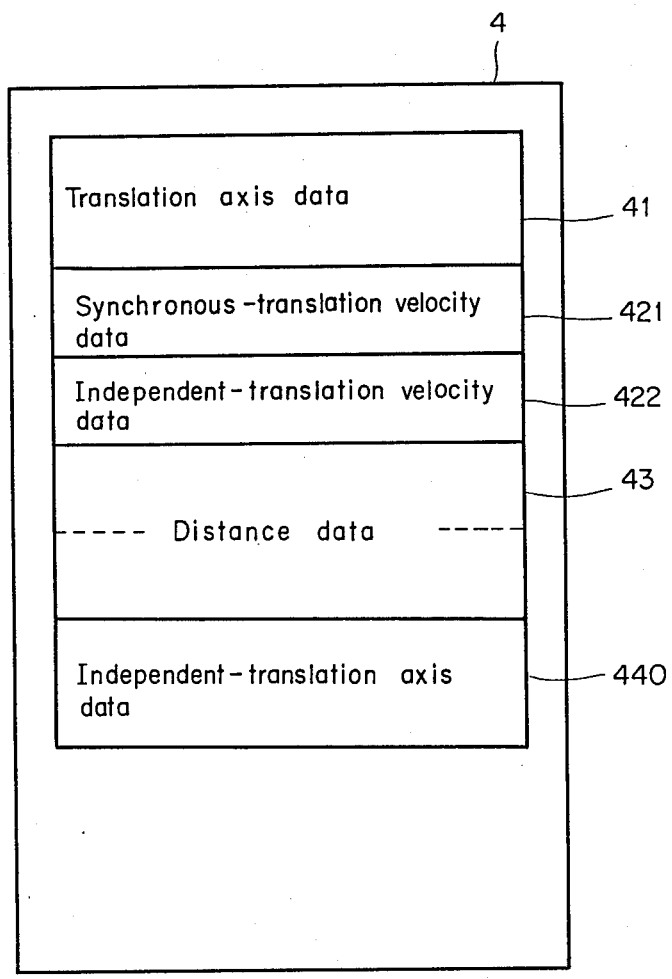
FIG. 2 illustrates memory regions of the numerical control apparatus according to the present invention.
Figure 3:
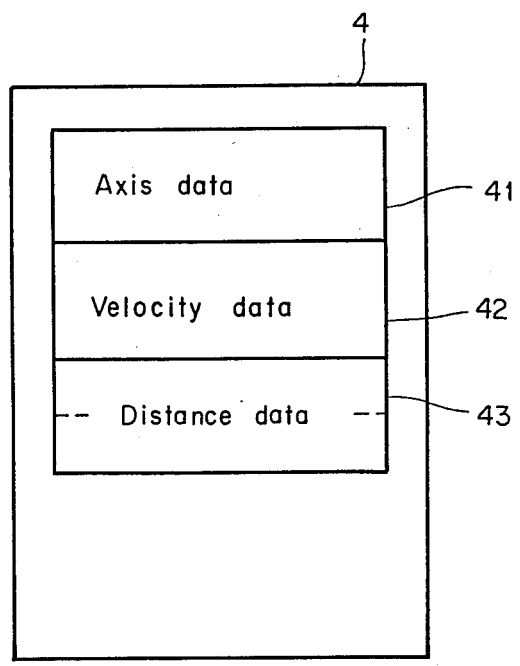
FIG. 3 illustrates memory regions of a conventional numerical control apparatus.

FIG. 2 illustrates the memory contents in the memory unit 4 according to a preferred embodiment.

There are provided a memory region 41 for storing the translation axis data; a memory region 43 for storing the distance data; a memory region 421 for storing sychronous-translation velocity data; a memory region 422 for storing independent-translation velocity data; and a memory region 440 for storing independent-translation axis data.

If the data is for a vectorial translation defined by multi-axes, then it is interpolated in the calculation unit 5 in order to resolve a given vectorial translation into a collection of axial components of infinitesimal increments in both distance and velocity.

The interpolation includes a linear interpolation for linear vectorial translation and arc interpolation for curve-vectorial translation. These collections of axial data components are stored in synchronous-translation velocity data region 421 and distance data region 43.

The translation axes are stored in the translation-axis data region 41.

If the data is for an independent translation, then it is processed for providing axis of translation, direction and distance of the translation in that axis, and velocity in that direction, and these data are stored in independent-translation axis data region 440, in distance data region 43, and in independent-translation velocity data region 422, respectively.

Upon command of execution of the numerical control the data are read from each of the corresponding memory regions of the memory unit 4 under control of CPU 3, and the resultant data calculated in the calculation unit 5 is output to the driving unit 6 for controlling the machine tool 7. The numerical control apparatus controls the machine tool 7 with respect to its velocity and distance to be translated in each specified axis by performing synchronous translations in plural axes of translation in a single axis.

Thus the machining of a workpiece can be processed in accordance with the numerical data which have been initially input from above-described paper tape 1.

A description will now be made of the concurrent independent translation by way of example.

A sample command G91GO1X100Y100Fx500Fy1000 is executed as follows.

G91 means incremental translation and GO1 a cutting stroke in this command. A tool is translated in the X-axis 100 mm from present position at a speed of 500 mm/min(Fx500), and another tool in the Y-axis 100 mm from present position at a speed of 1000 mm/min(Fy1000). The tools are independently translated in the X-axis and Y-axis at different velocities.

The above-described operation will be explained referring to FIG. 1 and FIG. 2. The above-defined data which has been recorded on the paper tape is input into CPU 3 via the input unit 2.

Figure 4:
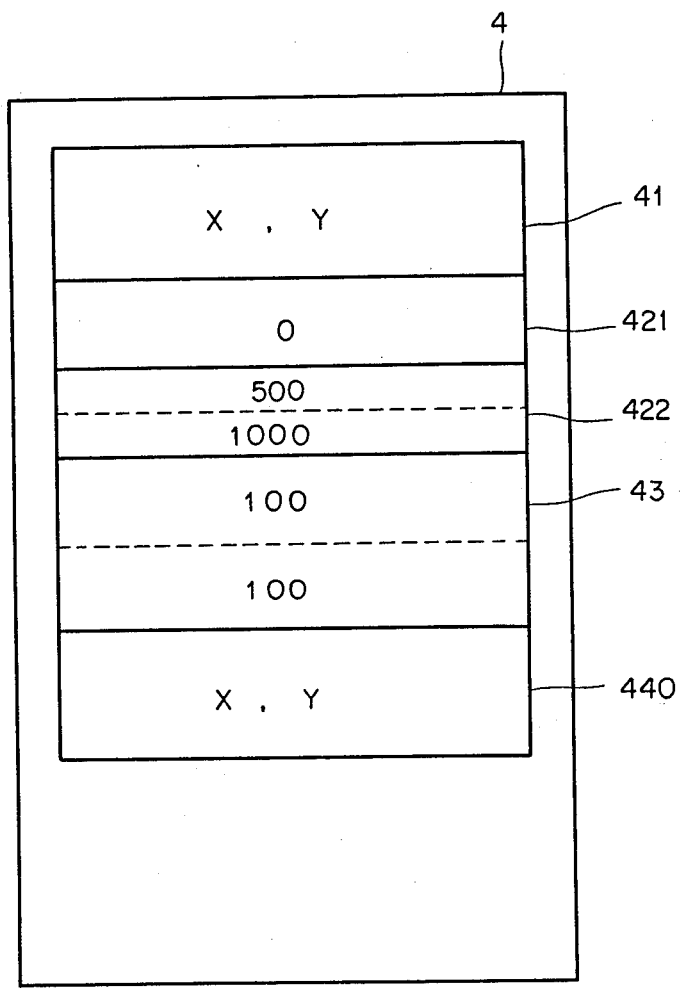
FIGS. 4 and 5 illustrate detailed memory regions of the memory regions shown in FIG. 2.

The CPU 3 decodes the date and stores codes X and Y in translation-axis data region 41 as shown in FIG. 4. Since no synchronous-translation velocity is involved in this command, zero is stored in synchronous-translation velocity data region 421. Numerical data 500 is stored in memory address corresponding to X-axis in independent-translation velocity data region 422 and numerical data 1000 in memory address corresponding to Y-axis of the independent-translation velocity data region 422. Numerical data 100 is stored in a memory address corresponding to the X-axis of distance data region 43 and numerical data 100 in a memory address corresponding to the Y-axis in the distance data region 43. Also, codes X and Y are stored in independent-translation axis data region 440. The drive unit 6 drives the machine tool 7 not in continuous smooth movement but in a series of a large number of infinitesimal increments.

Therefore, infinitesimal components of the velocity and the distance to be translated in each axis are calculated in the calculation unit 5 under control of CPU 3 on the basis of the distance data 100 and the velocity data 500 in the X-axis, and the distance data 100 and the velocity data 1000 in the Y-axis.

The resultant data are output to the drive unit 6 and the concurrent independent translation in the X-axis and the Y-axis are performed.

Figure 5:
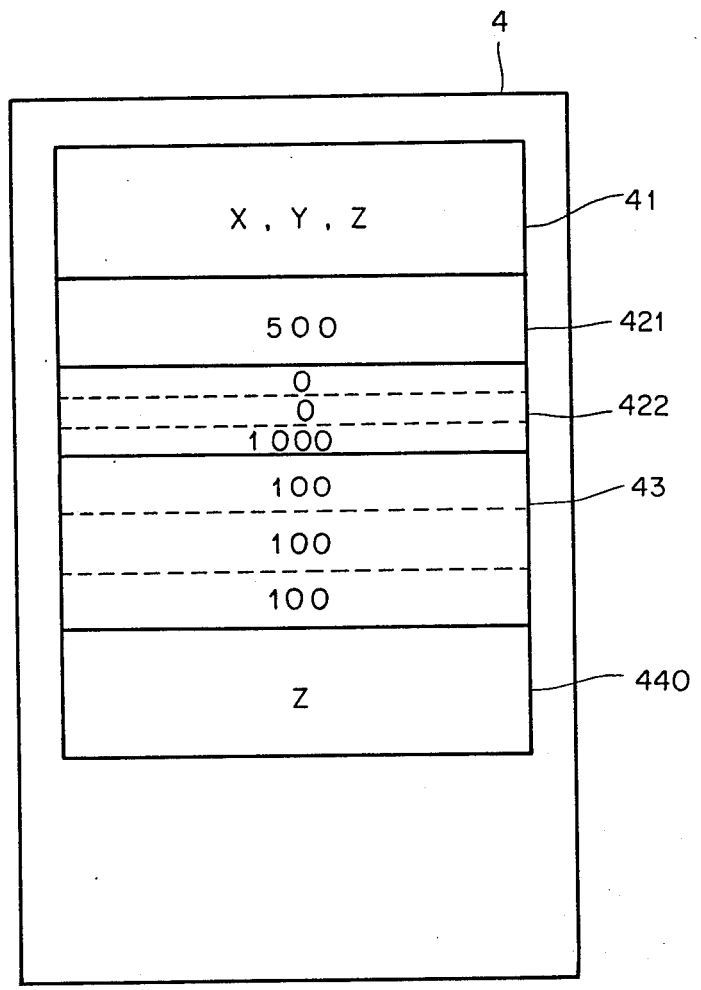

A description will now be made of the synchronous translation by way of example, with reference to FIG. 5.

A sample command G91GO1X100Y100Z100Fxy500Fz1000 is executed as follows.

This is a case in which translations in the X-axis and the Y-axis are in synchronism with each other and the translation in the z-axis is independent of the former translations.

Codes X, Y, and Z are stored in the translation axis data region 41 and velocity vector 500(Fxy500) having its components in X-axis and Y-axis is stored in synchronous-translation velocity data region 421.

Zero is stored in both the memory area corresponding to the X-axis and the memory area corresponding to the Y-axis of independent translation velocity data region 422. Numerical data 1000 is stored in the memory area corresponding to the Z-axis of the independent-translation velocity region 422. Numerical data 100 is stored in memory areas, each corresponding to the X-axis, the Y-axis, and the Z-axis respectively, of the distance data region 43.

Also, code Z is stored in the independent-translation axis data region 440.

A calculation is performed in the calculation unit 5 on the basis of the velocity vector data 500, the distance data 100 in the X-axis, and the distance data 100 in the Y-axis in order to provide a set of infinitesimal components of velocity and distance in the X-axis and the Y-axis in the form of signals by which the drive unit 6 can work.

These data are output to the drive unit 6 and the drive unit 6 performs the synchronous translation in the X-axis and the Y-axis and the independent translation in the Z-axis.

What is claimed is:

1. A numerical control apparatus for simultaneously performing plural control operations comprising:

an input unit (2) for receiving numerical control data from a source (1) thereof;

a central processing unit (CPU) (3);

a memory unit (4), said memory unit including a first memory region (41) for storing X, Y and Z translation-axis data, a second memory region (43) for storing distance data for each translation axis, a third memory region (421) for storing synchronous-translation velocity data for each translation axis, a fourth memory region (422) for storing independent-translation velocity data for each translation axis, and a fifth memory region (440) for storing independent-translation axis data; and means controlled by said CPU for processing data received from said source and storing each type of said data in respective memory unit regions and, upon command, selectively reading said stored data from said memory unit in accordance with said command, performing calculations to derive numerical control signals therefrom in the form of a plurality of incremental control signals representing control operations, and applying said control signals to control means for performing said control operations;

said control operations including each of a control operation such as linear translation wherein a single translation in an axis is performed, independent translation wherein translations of plural means are performed in different axes independently at the same time, synchronous translation wherein translations of a plurality of means are performed simultaneously in a plurality of axes, synchronous translation wherein translation of a single means is performed in a vectorial direction, and combinations of more than one of said translations simultaneously.

2. A numerical control apparatus as claimed in claim 1, further comprising a calculation unit for calculating said data read from said memory regions via said CPU to obtain the numerical control signals.

3. A numerical control apparatus as claimed in claim 2, wherein said control means includes a drive unit for accepting the numerical control signals from the calculation unit via said CPU and for controlling a machine tool in response thereto.

* * * * *

UNITED STATES PATENT AND TRADEMARK OFFICE
CERTIFICATE OF CORRECTION

PATENT NO. : 4,766,546

DATED : August 23, 1988

INVENTOR(S) : Akihiko FUJIMOTO

It is certified that error appears in the above-identified patent and that said Letters Patent is hereby corrected as shown below:

On the cover page, Item [54], line 4, "TRANSACTION" should read --TRANSLATION--.

Column 1, line 5, "TRANSACTION" should read --TRANSLATION--.

Signed and Sealed this

Twenty-first Day of February, 1989

Attest:

DONALD J. QUIGG

*Attesting Officer*     *Commissioner of Patents and Trademarks*